No. 824,014. PATENTED JUNE 19, 1906.
R. R. HAYWARD.
PLOW.
APPLICATION FILED APR. 5, 1905.
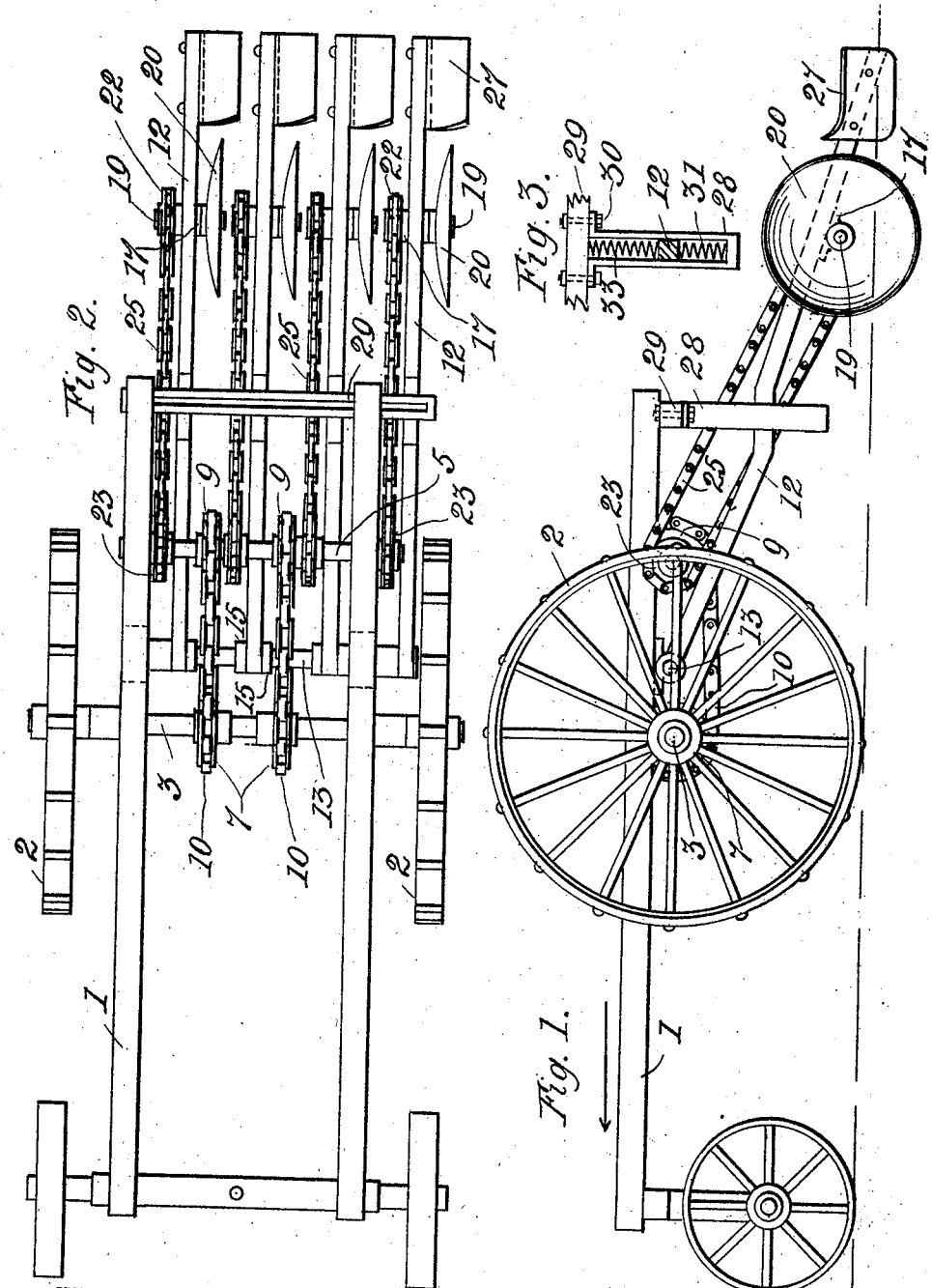
WITNESSES:
A. E. Miller
A. O. Bayley.
INVENTOR.
Rowland R. Hayward,
BY
ATTORNEYS.

UNITED STATES PATENT OFFICE.

ROWLAND R. HAYWARD, OF OWINGS MILLS, MARYLAND.

PLOW.

No. 824,014.    Specification of Letters Patent.    Patented June 19, 1906.

Application filed April 5, 1905. Serial No. 253,925.

*To all whom it may concern:*

Be it known that I, ROWLAND R. HAYWARD, of Owings Mills, in the county of Baltimore and State of Maryland, have invented certain Improvements in Plows, of which the following is a specification.

This invention relates to certain improvements in the construction and arrangement of certain parts of the plow, as and for the purposes hereinafter described.

In the description of the said invention which follows reference is made to the accompanying drawings, forming a part hereof, and in which—

Figure 1 is an exterior side view of such parts of the plow as embrace the present invention. Fig. 2 is a top view or plan of the same, and Fig. 3 is a detail of the machine.

Referring now to the drawings, 1 is the frame of the plow, and 2 2 are the traction-wheels secured to the shaft 3, which is driven by any suitable means from the motor, which as it embraces no part of the present invention is not shown in the drawings. 5 is a second shaft which is preferably rotated from the first shaft 3 by the sprocket-wheels 7 and 9 and the chain belts 10.

12 12 are loose vibratory arms journaled on a shaft 13, which extends transversely of the frame 1, to which it is connected in any suitable manner. To admit of the said arms being adjusted laterally of the shaft 13 and with respect to each other, their hubs are placed between set-collars 15. The arms 12 near their outer ends are provided with bearing-boxes 17, in which are adapted to rotate short shafts 19, carrying the tight disks 20, which may be flat or dished, as shown in the drawings, and in addition the sprocket-wheels 22. These sprocket-wheels are driven from similar wheels 23 on the second shaft 5 through the medium of the chain belts 25. The arms 12 also carry the fixed semimoldboards 27, the office of which will hereinafter appear. The arms 12 are susceptible of independent vibratory movement within guides 28, which guides are moved longitudinally of the slotted rear cross-frame 29 with the arms 12 when the same are adjusted in position on the shaft 13, as before referred to, and after such adjustment they are fastened by means of bolts 30. (Shown particularly in Fig. 3.)

The springs 31 serve to yieldingly support the arms 12 and their attachments, and the springs 33 have the effect of forcing the disks 20 into the earth with a yielding pressure.

It will be understood that when the plow is in operation and moving in the direction indicated by the arrow in Fig. 1 the disks 20 cut furrows in the earth, and the semimoldboards, which follow the disks, turn over the soil at the upper part of the furrows, and thus prevent the furrows from closing, particularly when the plow is moving in a curved path.

The independent action of the vibratory arms with their disks and moldboards is an important feature of the present invention, as should any one of the disks strike a stone it will rise without affecting the others. It also admits of one or more of the disks being placed out of service should the character of the soil or circumstances require such an expedient by removing the upper springs or by lashing the arms to the frame.

I have set out what appears to me to be simple and effective devices for securing the various movements required in the machine; but it is evident that in constructing the machines other mechanisms could be employed to produce similar results without deviating from the principles involved, and I do not, therefore, limit myself to the use of the specific mechanical appliances above described; but

I claim as my invention—

1. In a plow, a frame, a rotary driving-shaft supported by the frame, a series of independent vibratory arms carrying disks, means whereby each disk is rotated independently of the others from the driving-shaft, each vibratory arm having a guide, and a spring within the guide, whereby the said disk is forced in contact with the soil, substantially as specified.

2. In a plow, a frame, a rotary driving-shaft supported by the frame, a series of independent vibratory arms carrying disks, the said arms being laterally adjustable one with another whereby the distance between the disks may be increased or diminished, and guides for the said vibratory arms which are adjustable to suit any change in position of the said arms, substantially as specified.

3. In a plow, a series of vibratory arms carrying disks with means to rotate the said disks independently of each other combined with spring-supporting, and spring-actuating devices, the latter serving to force the disks in contact with the soil, substantially as specified.

4. In a plow, a driving-shaft, and a series of independent vibratory arms carrying disks and provided with moldboards situated in the rear of the disks, combined with means to rotate the said disks from the driving-shaft, substantially as specified.

ROWLAND R. HAYWARD.

Witnesses:
  OREGON MILTON DENNIS,
  A. O. BAYLEY.